(12) United States Patent
Gaertner et al.

(10) Patent No.: US 6,237,076 B1
(45) Date of Patent: May 22, 2001

(54) METHOD FOR REGISTER RENAMING BY COPYING A 32 BITS INSTRUCTION DIRECTLY OR INDIRECTLY TO A 64 BITS INSTRUCTION

(75) Inventors: Ute Gaertner; Klaus Jörg Getzlaff, both of Schönaich; Oliver Laub, Leinfelden; Erwin Pfeffer, Holzgerlingen, all of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/141,892

(22) Filed: Aug. 28, 1998

(30) Foreign Application Priority Data

Aug. 19, 1998 (EP) .............................................. 98 115 600

(51) Int. Cl.[7] .............................. G06F 13/38; G06F 11/00; G06F 9/34; G06F 9/22

(52) U.S. Cl. .............................. 712/23; 712/23; 712/244; 712/214; 711/202

(58) Field of Search .................................. 711/127, 202, 711/203; 712/244, 23, 210, 214

(56) References Cited

U.S. PATENT DOCUMENTS

| 5,454,091 | * | 9/1995 | Sites et al. | 711/203 |
| 5,519,841 | * | 5/1996 | Sager et al. | 711/202 |
| 5,574,928 | * | 11/1996 | White et al. | 712/23 |
| 5,966,530 | * | 10/1999 | Shen et al. | 712/244 |
| 5,978,887 | * | 11/1999 | Yeager | 711/127 |

* cited by examiner

*Primary Examiner*—Daniel H. Pan
*Assistant Examiner*—Te Yu Chen
(74) *Attorney, Agent, or Firm*—Lynn L. Augspurger

(57) ABSTRACT

A method and system for renaming registers of said system is proposed in which mixed instruction sets, e.g. 32 bit and 64 bit instructions are carried out concurrently in one program. In case of an instruction sequence of a preceding 64 bit instruction and one or more 32 bit instructions to be executed in-order after the 64 bit instruction and where the 32 bit instructions having a data dependence to the preceding 64 bit instruction, said rest of the register range changed by the preceding 64 bit instruction is copied to the corresponding location in a target register of the succeeding 32 bit instruction, at least if the same logical register is specified by the 32 bit instruction as it was specified by the preceding 64 bit instruction. The copy source is addressed by the register number and hold in a list (28).

3 Claims, 3 Drawing Sheets

| INSTR. # | DEPENDS ON | MNEMONIC | TYPE | NAME | PHYSICAL TARGET REG. | PHYSICAL SOURCE REG.1 | PHYSICAL SOURCE REG.2 |
|---|---|---|---|---|---|---|---|
| 1 | | LRG 4,5 | 64 BIT | LOAD-64 | 12:00-63 | 20:00-63 | --- |
| 2 | | LR 4,6 | 32 BIT | LOAD-32 | 13:32-63 C 13:00-31 | 21:32-63 <- 12:00-31 | --- |
| 3 | 2 | AR 5,4 | 32 BIT | ADD-32 | 14:32-63 C 14:00-31 | 20:32-63 <- 20:00-31 | 13:32-63 |
| 4 | 2,3 | AGR 4,5 | 64 BIT | ADD-64 | 15:00-63 | 13:00-63 | 14:00-63 |
| 5 | 2 | LR 5,6 | 32 BIT | LOAD-32 | 16:32-63 C 16:00-31 | 21:32-63 <- 14:00-31 | <- 20:00-31 |

C:COPY
NN:XX-YY: NN REGISTER NUMBER
XX FROM BIT POSITION
YY TO BIT POSITION

FIG.1

*)CHECK POINT SYNC

METHOD FOR REGISTER RENAMING BY COPYING A 32 BITS INSTRUCTION DIRECTLY OR INDIRECTLY TO A 64 BITS INSTRUCTION

BACKGROUND OF THE INVENTION

1. Technical Field

The present invention relates in general to an improved data processing system, and in particular to a method and system working with mixed instruction sets, e.g. 32 bit and 64 bit instructions within the data processing system. Still more particularly, the present invention relates to a method and system for renaming registers of said system as they are required for the concurrent execution of 32 bit and 64 bit instructions while having data dependencies among each other.

2. Description of the Related Art

As the quest for greater data processing system performance continues, central processing unit (CPU) designers have implemented superscalar data processing systems that are capable of issuing multiple independent instructions into multiple execution pipelines, wherein multiple instructions are executed in parallel. An example of such a superscalar data processing system is the superscalar microprocessor sold under the trademark "PowerPC" by IBM Microelectronics and Motorola Semiconductor. The "PowerPC" architecture is described in more detail in various user's manuals, including 'PowerPC 603-RISC MICROPROCESSOR USER'S MANUAL," copyright 1994, IBM Part No. MPR603UMU-01.

Within the superscalar microprocessor, instructions are fetched from an instruction cache and are dispatched in program order to one of a plurality of execution units, wherein the instruction is executed by an execution unit appropriate for the particular type of instruction. For example, floating-point instructions are dispatched to one or more floating-point execution units, while fixed-point instructions are dispatched to one or more integer units. While instructions are dispatched in program order, instruction execution may occur out of order, depending upon availability of execution units and other data processing system resources.

In the superscalar processor, instructions may be dispatched, executed, and "finished" before other instructions that were previously dispatched. In order to prevent out-of-order instruction execution from placing data in an architected register at the wrong time, instruction execution is "completed" in program order by a completion unit. Thus, a subsequently dispatched instruction may "finish" before a previously dispatched instruction finishes, but the subsequently dispatched instruction may not be "completed" before completion of the previously dispatched instruction.

As is known in the art, "PowerPC" includes register renaming techniques for resolving data dependencies between instructions following each other after passing the dispatching unit. Logical registers are assigned to a plurality of physical registers in an assignment list so that they can be passed to a plurality of reservation stations each dedicated to supply a given execution unit with instructions to be executed.

With increasing need to address more than 4 Gigabyte of data—the maximum address space being addressable with 32 bit—the address calculation necessitates registers and arithmetic units capable to process address data with the next step size of 64 bit addresses. A special need exists, however, to handle both, 32 bit and 64 bit handling instructions—mixed instruction sets—in one program.

In general, 32 bit instructions leave the high part of a 64 bit register unchanged, succeeding 64 bit instructions use the full register size with the changes made by 32 bit instructions.

Register renaming as used for speculative instruction execution requires to write newly generated result data into a new physical register, thus ensuring that architected, logical registers can be kept in program order at retire time and to have a mean to discard faulty executed instructions.

The result data of the preceding 32 bit instructions cannot be used, because consecutive 32 bit LOAD instructions would get a source dependency on the preceding LOAD instruction. All 32 bit LOAD instructions would be executed in-order: each LOAD had to wait until the preceding one has processed its result data, required as source of the high part register contents in the succeeding instruction.

Straight forward 64 bit/32 bit register renaming would break a 64b register into a high and a low part register and would rename the both registers separately. But this approach would double the renaming logic with possible impact on the cycle time of the processor.

SUMMARY AND OBJECTS OF THE INVENTION

One object of the invention is to allow 32 bit LOAD instructions to be executed out-of-order and in parallel on different load units even when there are data dependencies to a preceding 64 bit instruction whenever the high part of a 64b register is available.

Another object of the invention is to implement the proposed method for mixed instruction sets of 32 bit and 64 bit instruction sets, respectively with a minimum expense of logic circuits.

These and other objects are achieved in a data processing system by a method and a system for renaming registers in which mixed instruction sets, e.g. 32 bit and 64 bit instructions are carried out concurrently in one program.

In case of an instruction sequence of a preceding 64 bit instruction and one or more 32 bit instructions to be executed in-order after the 64 bit instruction and where the 32 bit instructions having a data dependence to the preceding 64 bit instruction, said rest of the register range changed by the preceding 64 bit instruction is copied to the corresponding location in a target register of the succeeding 32 bit instruction, at least if the same logical register is specified by the 32 bit instruction as it was specified by the preceding 64 bit instruction. The copy source is addressed by the register number and hold in a list (28).

The basic idea is to copy the high part of the 64 bit register, which was changed by a preceding 64 bit instruction to the new allocated target register of a 32 bit instruction. The copy process is made in parallel to the execution of the 32 bit instruction, with no performance penalty. In case of a 32 bit LOAD instruction the source register address is taken from the so-called 64 bit-GPR file (general purpose file), which is addressed by the physical register number used as target register of the preceding 64 bit instruction. For 32 bit ALU instruction the first operand specifies source and target of the ALU operation; therefore the high part of the first source operand contains already the correct copy data.

Thus, new allocated registers, which are used to hold the result data for a 32 bit instruction in the low part of the register must be loaded with the high part data of the preceding 64 bit instruction if the same logical register is specified.

The proposed renaming method has no impact on the number of rename registers and register contents valid logic i.e. complex logic macros such as the reservation station remain unchanged.

The above, as well as additional objects, features, and advantages of the present invention, will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a table in which a sequence of mixed set, e.g. 32 bit and 64 bit instructions is described, where some instructions depend on other instructions in the sequence.

DETAILED DESCRIPTION OF THE PREFERRED EMBODIMENT

Figure 2:
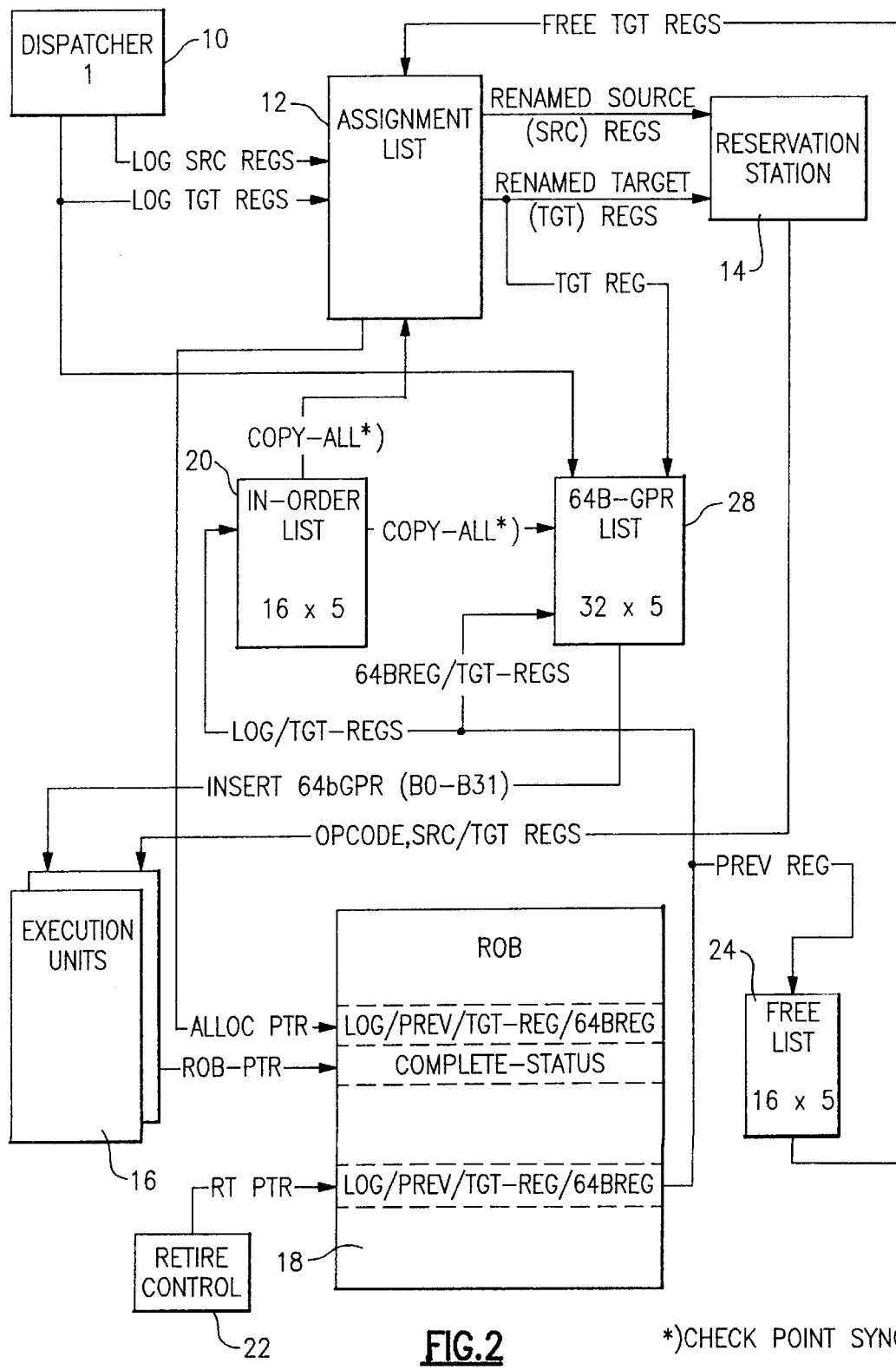
FIG. 2 is a simplified high-level block diagram of the superscalar processor in accordance with a preferred embodiment of the present invention.

With reference now to the figures and in particular with reference to FIG. 1, there is depicted a table in which a sequence of mixed set, e.g. 32 bit and 64 bit instructions occur. Instruction No. 2 depends on 1 (high part of logical register 4 must be available), and instructions No. 2, 3, 4 depend on instructions No. 1, 2, 3, respectively (see FIG. 1).

64 bit instruction No.1 places bits 00–63 from register 20 unchanged at the first operand location 12:00–63, assuming the logical register 5 is renamed to the physical register 20 and the logical target register 4 is allocated as physical register 12.

32 bit instruction No.2 places bits 32–63 from register 21 at the first operand location 13:32–63 and copies 12:00–31 to 13:00–31. This copy process is necessary because register 13 is only partially changed and the high part of the logical register is unchanged. The logical register 4 is mapped to physical register 13, so the contents of both registers must be the same if the instruction retires.

32 bit instruction No.3 places the sum of 13:32–63 and 20:32–63 at the first operand location 14:32–63 and copies 20:00–31 to 14:00–31.

64 bit instruction No.4 places the sum of 13:00–63 and 14:00–63 at the first operand location 15:00–63.

32 bit instruction No.5 places bits 21:32–63 at the first operand location 16:32–63 and copies 20:00–31 to 16:00–31.

Thus, instruction No.3 depends on the result of instruction No.2, instruction No.4 needs the results of instructions No. 2 and 3, and instruction No.5 needs source register 1 of instruction No.2.

The new allocated register of instruction No.2 holds the result of an 32 bit cache access (LOAD) in its low part. It is loaded (depicted by the letter 'c' in the table of FIG. 1) with the high part data of the preceding 64 bit instruction because the same logical register No.4 was specified for both instructions. This copy process 'c' of the high part of the 64bit register is made in parallel to the execution of the 32bit instruction, with no performance penalty.

Instruction No.3 accesses the low part of physical register No.13 thus, it is not affected by the copy process done with instruction No.2. Here, the corresponding copy is made by loading the higher part of physical register No.20 into the higher part of the newly allocated target register No. 14.

Thus, instruction No.4 to which had been assigned the logical registers No.4 and 5, respectively, can access all 64 bit of its first source register No.13 as well as all 64 bit of its second source register No.14.

While the succeeding instruction No.5 is executed the higher part of it's newly allocated physical target register No.16 is filled with the higher part of register No. 14.

With reference now to FIG. 2 which is a high-level block diagram of the superscalar processor in accordance with a preferred embodiment of the present invention, only a summarizing overview concerning the data flow is intended to be given.

In the dispatching unit 10 the incoming instructions are predecoded and are assigned to logical registers. The assignment of logical to physical registers is buffered in the assignment list 12. The instructions are dispatched to different reservation stations 14 each supplying separate execution units 16. After out-of-order execution the in struction results are put into GPR-FILE 28. The complete status of the instructions is maintained in the reorder buffer (ROB) 18 for ensuring an architected machine status in case of faulty executed instructions. The in-order list 20 holds this architected machine status and can be copied to the assignment list 12 for restarting execution with an architected safe state of the machine after wrong speculative execution. The retire control 22 determines which registers can be freed and be marked as such in the free list 24. This information is passed to the assignment list 12 for recycling the registers to be made available for new incoming instructions.

The copy process according to a preferred embodiment of the invention is shown to be embedded in the above described summarizing scheme as being implemented by the 64 bit GPR list 28 and the general purpose register (GPR) file not depicted separately but as a part of the execution units.

The management of the 64b-GPR list together with the register-contents-available control is regarded as the main part of the present invention.

At allocation time the new allocated 64 bit register number is written into the 64 bit-GPR list. It is addressed by the same 64 bit register number (one to one look-up).

The contents of these registers is set to "not available" meaning that succeeding 32 bit LOAD instructions using the same logical register wait until the preceding 64 bit instruction is executed. A succeeding ALU instruction can use the same logic but there is no actual requirement, because one and the same logical register is source and target. The renamed source register might be used directly, a look-up in the 64 bit GPR list 28 is not necessary.

New allocated 32 bit LOAD instructions are written to the reservation station 14 with a source dependency on this 64 bit register, but make no entry in the 64b-GPR list 28.

At instruction execution time either at begin or end of a 64 bit instruction depending on the bypass control of the execution pipes the register-contents-available control is set to "available" in the reservation station 14 and in the 64 bit GPR list 28 thus allowing all 32 bit LOAD instructions with the same logical target register as the preceding 64b instruction being made ready for execution.

32 bit instructions do not make an entry in the 64 bit GPR file 28 neither for the target register nor for the register-contents-available control.

At retire time all 32 bit instructions, which have (partially) changed a target register write this register number into the 64 bit GPR list 28 addressed by the 64 bit register number of the preceding 64 bit instruction having changed the same logical register. 64 bit instructions may do the same but there is no requirement to do so.

The register-contents-available-bit remains unchanged (i.e. it remains set, because register is available at retire time).

This ensures that the initially allocated 64 bit register can be retired and put onto the free list 24 without losing track to its correct contents. It should be noticed that the contents of a 64 bit target register of a 32 bit instruction is available at retire time. In general, this action will generate a substitute source register for the initially allocated 64 bit register of the 64 bit instruction being put into the free list 24.

In case of Exceptions or Interrupts the in-order list 20 is copied to the 64 bit GPR list 28.

Figure 3:
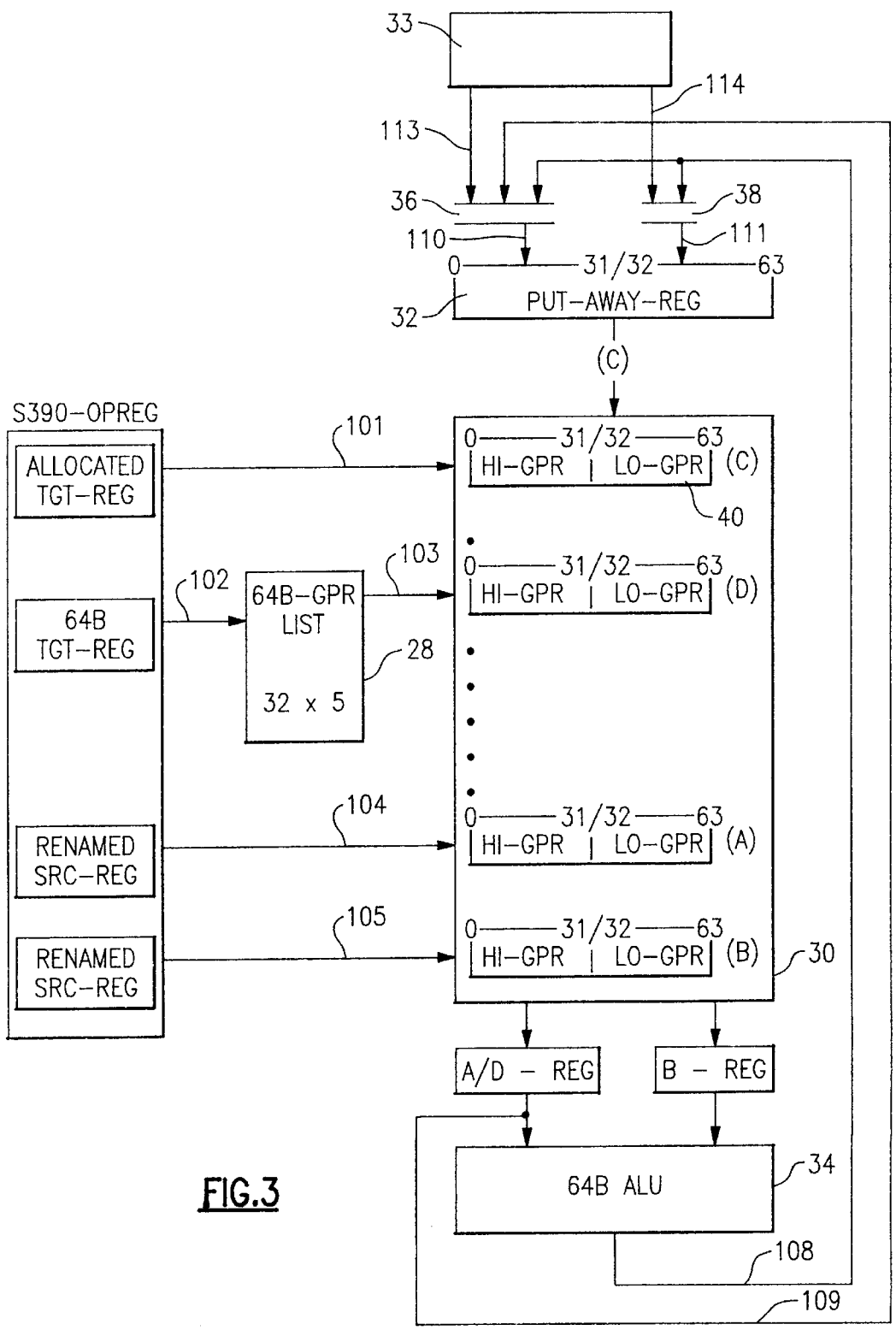
FIG. 3 depicts a schematic representation of the method of the present invention with the focus to the copy process of the high part of the 64 bit register.

With reference now to FIG. 3 which depicts a schematic representation of the method of the present invention with the focus being set to the copy process of the high part of the 64 bit register the copy process is described in more detail.

The GPR file 30 is supplied via line 101 with an array address for a write operation to the GPR into a C register 40 file if the transfer of result data into the specified register is required as it was shown in FIG. 1 for in struction No. 1 and No. 4. The result data is collected in the Put-away-register 32 which can be loaded from the cache 33 or from the 64 bit ALU 34 or with the high word, bits 0 . . . 31, via lines 113, 108 and 109, respectively, or from cache, or from ALU 34 via line 114 and 108. High- and low word data are multiplexed by 36 and 38, which generates line 110 and 111. This Put-away-register 32 is required because data from cache or ALU arrive late in the cycle. The PUT-AWAY-REG which latches the data, is fed by the multiplexer 36 and 38. It guarantees usage of the whole available cycle time to write data into the GPR-file.

The address of the 64 bit target register is built at allocation time and is saved in the reservation station until the instruction is ready to be executed. It addresses via line 102 the 64 bit GPR list 28. This remapped address (103) is used for read operations to get the data value D.

The contents of a 64 bit register to be written into this list is concatenated in the Put-away-register 32; e.g. with the data of a 32 bit LOAD-instruction which has valid data only in the low part of the register and the data D addressed via line 103 from the GPR-list 28, latched in A/D register 42 for cycle time reasons as mentioned above and moved via data bus 109 to the put-away-register. For that, the address derived from line 101 is used to write the 64 bit data into the GPR-file 30.

Source addresses for an instruction with two source operands are saved in the reservation station and fed into ALU 34 via lines 104 and 105, respectively, after being latched in AID register 42 and B register 44 in order to use the whole cycle time for processing.

In case of a 32 bit instruction, the low part of the result data is taken from the ALU 34 and is transferred via data bus 108. The high part is taken directly from A/D register 42 and is transferred via data bus 109 to the put-away-register 32, where both data portions are concatenated and written into the GPR-file 30 one cycle later.

In case of an 64 bit ALU instruction the 64 bit ALU result is transferred via data bus 108 into the put-away-register 32 and from there back into the GPR-file 30.

While the foregoing description of the preferred embodiment of the method and system of the present invention has been described in its essential items, another, alternative hardware implementation of the 64b-GPR list is also possible without making use of the 64b-GPR list:

While the 64 bit source copy register is not put to the free list 24 the renamed source address of the instruction itself is used.

If the 64 bit source register is put to the free list 24 the in-order-file 20 is used to get the copy source register number.

The disadvantage of this method is that additional logic which is necessary to find out when the 64 bit source register is put to the free list 24; starting at this point the copy source address must be taken from in-order file. But the in-order file 24 is addressed with logical addresses with the required renamed address as output.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than in a restrictive sense.

Having thus described our invention, what we claim as new and desire to secure by Letters Patent is:

1. Method in a data processing system for executing mixed sets of instructions comprising a large number and a small number of bits for 64 bit instructions and for 32 bit instructions, respectively, using registers with bits according to the large number 64 bit instructions, the registers rest outside a range corresponding to the small number 32 bit instructions not being used by the small number bit instructions, the method comprising the step of copying said rest of the register range changed by a preceding large number 64 bit instruction to the corresponding location in a target register of a succeeding small number 32 bit instruction, at least if the same logical register is specified by the small number 32 bit instruction as was specified by the preceeding large number 64 bit instruction, wherein in said copying the higher part of the bit range is made in parallel to the execution of the 32 bit instruction succeeding directly or indirectly to the 64 bit instruction.

2. The method of claim 1, wherein in case of a succeeding 32 bit LOAD instruction the source register address representing the higher part of the bit range is taken from a general purpose register list (28), which is addressed by the physical register number used as target register of the preceding 64 bit instruction.

3. A Data processing system executing mixed sets of instructions comprising a large number and a small number of bits, respectively, using registers with bits according to the large number bit instructions, the registers rest outside a range corresponding to the small number bit instructions not being used by the small number bit instructions, the system comprising:
means for copying said rest of the register range changed by the preceding large number bit instruction to the corresponding location in a target register of the succeeding small number bit instruction, at least if the same logical register is specified by the small number bit instruction as it was specified by the preceding large number bit instruction wherein the means for copying comprise a buffer (28) in which address information is held for determining the copy source and the address information is held for determining the copy source is held in general purpose register list (28) in form of the physical register number used as target register of the preceding large number bit instruction.

* * * * *

UNITED STATES PATENT AND TRADEMARK OFFICE
CERTIFICATE OF CORRECTION

| | |
|---|---|
| PATENT NO. | : 6,237,076 B1 |
| DATED | : May 22, 2001 |
| INVENTOR(S) | : Gaertner et al. |

It is certified that error appears in the above-identified patent and that said Letters Patent is hereby corrected as shown below:

<u>Title page and column 1,</u>
In the title "METHOD FOR REGISTER RENAMING BY COPYING A 32 BITS INSTRUCTION DIRECTLY OR INDIRECTLY TO A 64 BITS INSTRUCTION" should be -- METHOD FOR DATA PROCESSING SYSTEM EXECUTION OF MIXED SETS OF INSTRUCTIONS WITH REGISTER RENAMING INCLUDING COPYING A HIGHER PART OF THE BIT RANGE OF AN INSTRUCTION IN PARALLEL TO THE EXECUTION OF A 32 BIT INSTRUCTION SUCCEEDING DIRECTLY OR INDIRECTLY TO A 64 BIT INSTRUCTION --;

Signed and Sealed this

Thirtieth Day of April, 2002

*Attest:*

*Attesting Officer*

JAMES E. ROGAN
*Director of the United States Patent and Trademark Office*